(12) United States Patent
Pautis (10) Patent No.: US 10,731,602 B2
(45) Date of Patent: Aug. 4, 2020

(54) THRUST REVERSER SYSTEM EXHIBITING LIMITED AERODYNAMIC PERTURBATION

(71) Applicant: Airbus Operations S.A.S., Toulouse (FR)

(72) Inventor: Olivier Pautis, Merville (FR)

(73) Assignee: Airbus Operations S.A.S. (FR)

( * ) Notice: Subject to any disclaimer, the term of this patent is extended or adjusted under 35 U.S.C. 154(b) by 431 days.

(21) Appl. No.: 16/001,331

(22) Filed: Jun. 6, 2018

(65) Prior Publication Data

US 2019/0003420 A1    Jan. 3, 2019

(30) Foreign Application Priority Data

Jun. 13, 2017    (FR) ...................................... 17 55315

(51) Int. Cl.
  *F02K 1/72*   (2006.01)
  *F02K 1/76*   (2006.01)
  *F02K 3/06*   (2006.01)

(52) U.S. Cl.
  CPC ................ *F02K 1/72* (2013.01); *F02K 1/763* (2013.01); *F02K 3/06* (2013.01); *F05D 2260/50* (2013.01)

(58) Field of Classification Search
  CPC ..... F02K 1/70; F02K 1/72; F02K 1/74; F02K 1/763; F02K 3/06; F05D 2260/50
  See application file for complete search history.

(56) References Cited

U.S. PATENT DOCUMENTS

| | | | |
|---|---|---|---|
| 5,799,903 A * | 9/1998 | Vauchel | F02K 1/68 239/265.19 |
| 8,162,257 B2 | 4/2012 | Teulou | |
| 8,720,818 B1 | 5/2014 | Teulou et al. | |
| 2013/0025259 A1* | 1/2013 | Beardsley | F02K 1/72 60/226.2 |
| 2013/0205753 A1* | 8/2013 | Todorovic | F02K 3/025 60/226.2 |
| 2013/0228635 A1 | 9/2013 | Caruel | |
| 2014/0131480 A1* | 5/2014 | Hurlin | F02K 1/72 239/265.19 |
| 2014/0150403 A1* | 6/2014 | Stuart | F02K 1/72 60/204 |
| 2016/0160798 A1 | 6/2016 | Guerin et al. | |

(Continued)

FOREIGN PATENT DOCUMENTS

DE   10 2013 206595 A1   10/2014
EP      3 030 774 A1    6/2016

(Continued)

*Primary Examiner* — Carlos A Rivera
(74) *Attorney, Agent, or Firm* — Lerner, David, Littenberg, Krumholz & Mentlik, LLP (57) ABSTRACT

A thrust reverser system includes a thrust reversal cascade and a reverser door which are accommodated in a housing situated outside a secondary flow duct. The system also includes connection parts the presence of which combined with the action of the actuator gives rise simultaneously to: displacement rearwards of the cascade in the direction of a nacelle opening, cleared by a nacelle cowling entrained rearwards together with the cascade; and a combined movement of the reverser door relative to the cascade, leading to displacement of the front end of the door rearwards along the cascade, and to pivoting of this door, such as to give rise to plunging of its rear end into the secondary flow duct.

12 Claims, 4 Drawing Sheets

(56) References Cited

U.S. PATENT DOCUMENTS

| | | | |
|---|---|---|---|
| 2016/0160799 A1 | 6/2016 | Gormley | |
| 2016/0363097 A1* | 12/2016 | Foutch | F02K 1/72 |
| 2017/0175674 A1* | 6/2017 | Schrell | F02K 1/62 |
| 2017/0198659 A1* | 7/2017 | Gormley | F02K 1/70 |
| 2017/0226962 A1* | 8/2017 | Crawford | F04D 29/522 |
| 2018/0066606 A1* | 3/2018 | Pautis | F02K 1/72 |
| 2018/0087474 A1* | 3/2018 | Chuck | F02K 1/763 |
| 2018/0106216 A1* | 4/2018 | Jolivet | F02K 1/62 |

FOREIGN PATENT DOCUMENTS

| | | |
|---|---|---|
| FR | 2 935 354 A1 | 3/2010 |
| FR | 2 935 444 A1 | 3/2010 |

* cited by examiner

THRUST REVERSER SYSTEM EXHIBITING LIMITED AERODYNAMIC PERTURBATION

FIELD OF THE INVENTION

The invention relates to the field of thrust reverser systems for aircraft turbine engines. It relates more particularly to systems comprising thrust reversal cascades equipping double-spool turbine engines.

The invention also relates to an aircraft comprising turbine engines equipped with thrust reverser systems of this type. It preferably applies to commercial aircraft.

BACKGROUND OF THE INVENTION

Thrust reverser systems are known for example from documents FR 2 935 444 and FR 2 935 354. Amongst the different thrust reverser principles implemented in aircraft turbine engines, reversal cascade systems are known provided with passages oriented such as to direct the air obtained from the secondary flow duct forwards in order to generate the counter-thrust force. The air is forced to be extracted from this secondary flow duct by reverser doors which close this flow duct at least partially in the active configuration of the system.

On the other hand, in the inactive configuration, each reverser door is in the retracted position in which it participates in the formation of the outer wall of the secondary flow duct, also known as the OFS (Outer Fixed Structure). More specifically, in this inactive configuration of the reverser system, each door constitutes part of this outer wall of the secondary flow duct, within a nacelle outer mobile cowling containing the reversal cascade. During the transition from the inactive configuration to the active configuration, the outer mobile cowling is displaced rearwards by actuators, such as to clear the cascade, and bring the reverser doors into their position of closing of the secondary flow duct, by means of appropriate mechanical kinematics.

Although this principle is extensively applied, it nevertheless suffers from a problem of aerodynamic perturbations of the flow of air which passes through the secondary flow duct in the inactive configuration of the system. In fact, in this configuration, the flow of air within the secondary flow duct is perturbed during its passage to the areas of joining between the body of the outer mobile cowling and the reverser doors which are added onto this body. This perturbation is derived from the drag as well as from the pressure losses within the secondary flow duct, which lead to a decrease in the overall performance of the turbine engine.

BRIEF SUMMARY OF THE INVENTION

There may therefore a need for optimization of the design of these thrust reverser systems, in order to reduce the perturbations of the flow of air in the secondary flow duct, in the inactive configuration of the thrust reverser system.

A subject of the invention is a thrust reverser system for a turbine engine of a double-spool aircraft, the reverser system comprising at least one thrust reversal cascade through which the air of a secondary flow duct of the turbine engine is designed to circulate in the active configuration of the reverser system, the latter also comprising at least one reverser door which is configured to close the said secondary flow duct at least partly when the system is in the active configuration, the system also comprising at least one actuation actuator.

According to an embodiment of the invention, in an inactive configuration of the reverser system, the door is accommodated in a housing situated outside the said secondary flow duct, and in which there is also located the said cascade entrained by the said actuator, and a rear end of which is integral with a nacelle outer mobile cowling, the system also comprising:
  a first connection part, a first end of which is connected inside the said nacelle outer mobile cowling by a first articulated connection, and a second end of which is connected to the reverser door by a second articulated connection;
  a second connection part, a first end of which is connected to a rear end of the reverser door by a third articulated connection, and a second end of which is connected to an inner wall of the secondary flow duct by a fourth articulated connection.

In addition, the reverser door is fitted at its front end on the cascade by a fifth connection which allows this front end to slide along the cascade and to pivot relative to the latter, the second articulated connection being arranged between the third articulated connection and the fifth connection, such that, during transition from the inactive configuration to the active configuration, the action of the said actuator gives rise simultaneously to:
  displacement rearwards of the cascade in the direction of a nacelle opening, cleared by the nacelle outer mobile cowling entrained rearwards together with the cascade; and
  a combined movement of the reverser door relative to the cascade, leading firstly to displacement of the front end of the door rearwards along the cascade, and secondly to pivoting of this door according to the fifth connection, such as to give rise to plunging of its rear end into the secondary flow duct.

An embodiment of the invention thus contrasts with conventional configurations of the cascade reversal systems, by providing a reverser door which is arranged outside the secondary flow duct in the inactive configuration of the system, and is displaced relative to the cascade, whilst plunging into the secondary flow duct during the transition to the active configuration. Thanks to this design specific to an embodiment of the present invention, when the system is in the inactive configuration, the reverser door no longer perturbs the flow of air travelling through the secondary flow duct of the turbine engine. Advantageously, this makes it possible to improve the overall performance of the turbine engine.

Aspects of the invention preferably provide at least one of the following optional characteristics, taken in isolation or in combination.

In the inactive configuration, the first connection part is accommodated in the housing situated outside the said secondary flow duct, whilst remaining inside a fixed outer cowling of the nacelle, and the second connection part is accommodated partly in this housing.

In the inactive configuration, part of the second connection part is arranged substantially radially in the secondary flow duct, and is preferably designed to be shielded from a secondary flow of air by an arm of an intermediate casing of the turbine engine also known as the OGV (Outlet Guide Vane), and, in the active configuration, the said second connection part is arranged locally substantially parallel to the inner wall of the secondary flow duct.

The first connection part preferably adopts a form globally of an "L".

The actuator comprises an actuator rod which is articulated on a front end of the cascade.

The fifth connection comprises at least one door guide rail which is integral with the cascade, and extends along the latter, as well as a roller which cooperates with this rail, and is fitted on the front end of the reverser door.

The said housing is an inner space of the nacelle.

In the inactive configuration, the cascade and the reverser door are substantially parallel, and are each situated at least partly radially opposite a fan casing of the turbine engine.

The system comprises a plurality of cascades which are adjacent in the tangential direction of the turbine engine, preferably such as to form an assembly of cascades extending over an angular sector of 300 to 360° around a longitudinal axis of the turbine engine, and each cascade is associated with a reverser door.

The cascades are connected to one another mechanically, such that the number of actuators is preferably smaller than the number of cascades. However, these two numbers could be identical, without departing from the context of the invention.

The invention also relates to a double-spool aircraft turbine engine comprising a thrust reverser system as described above, as well as to an aircraft comprising at least one such turbine engine.

Other advantages and characteristics of the invention will become apparent from the following non-limiting detailed description.

BRIEF DESCRIPTION OF THE DRAWINGS

This description will be provided with reference to the appended drawings, in which.

DETAILED DESCRIPTION

Figure 1:
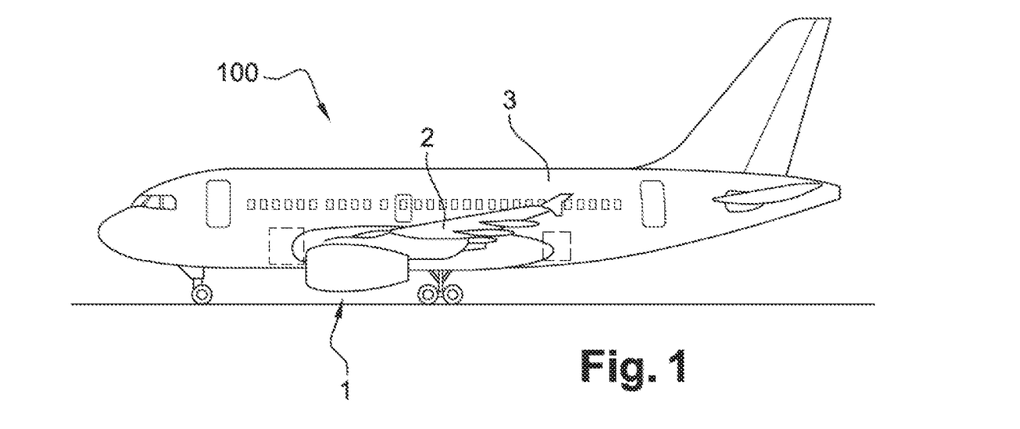
FIG. 1 represents a plan side view of an aircraft comprising a turbine engine equipped with a thrust reverser system according to the invention.

FIG. 1 represents an aircraft 100 of the commercial aircraft type, comprising two wings 2 (only one of which is shown in FIG. 1) secured on a fuselage 3, and each supporting a turbine engine 1 of the double-spool type, such as a turbojet engine.

A preferred embodiment of the turbine engine 1 will now be described with reference to FIGS. 2 to 4. Throughout the following description, by convention, the direction X corresponds to the longitudinal direction of the turbine engine, this direction being parallel to the longitudinal axis 6 of this turbine engine. Also, the direction Y corresponds to the direction oriented transversely relative to the turbine engine, and the direction Z corresponds to the vertical direction or the height, these three directions X, Y, Z being orthogonal to one another.

Figure 4:
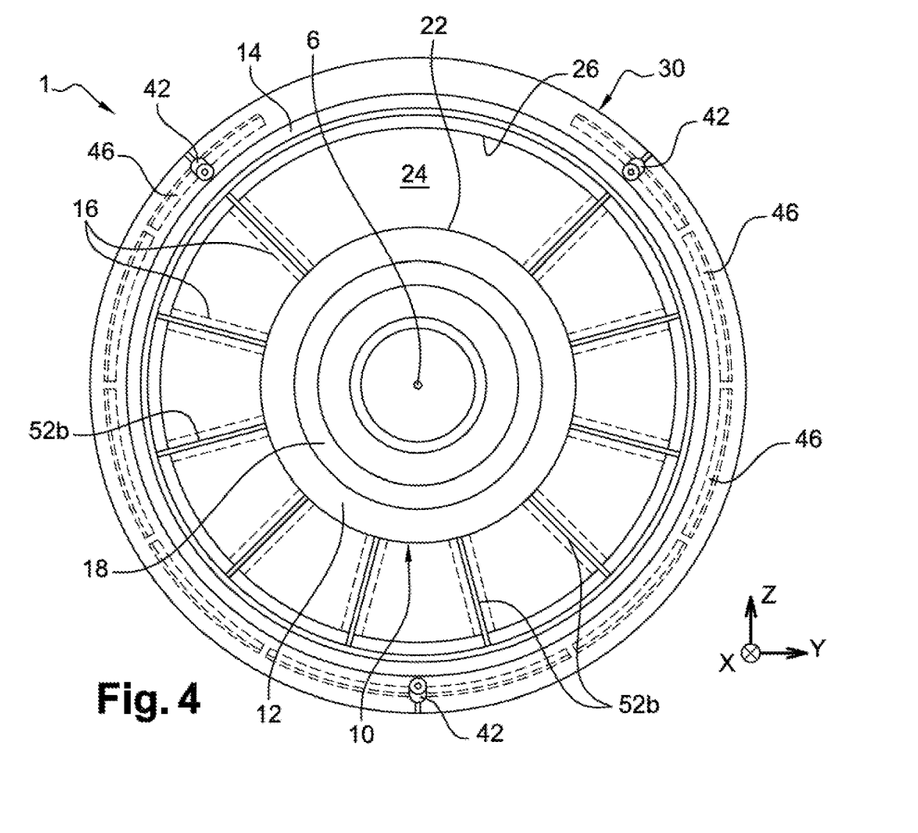
FIG. 4 represents a view in transverse cross section of the turbine engine shown in FIGS. 2 and 3 (without the OGVs)

In a conventional manner, the turbine engine 1 comprises a fan casing 8 which is centered on the axis 6 and is extended by an intermediate casing 10, formed by a hub 12 and an outer ferrule 14 connected to this hub by means of arms 16 represented schematically in FIG. 4. The arms 16 extend substantially radially, and at least some of them constitute outlet guide vanes also known as OGVs. Preferably, at least some of these arms 16 are structural, as well as being profiled aerodynamically. The hub 12 is extended rearwards by a central casing also known as the core casing, which has the reference 18 in FIG. 4, and contains the heart of the turbine engine. An inter-duct compartment 20 is provided around the central casing, which compartment is delimited by a fixed inner cowling 22 also known as the IFS. More specifically this is an inner wall 22 which delimits a secondary annular flow duct 24 of the turbine engine. This flow duct 24 is delimited at the front by the fan casing 8 as well as by the intermediate casing, and is then extended rearwards, thus being delimited internally by the cowling 22, and externally by an outer wall of the secondary flow duct 24, also known as the OFS. The latter is integrated in a nacelle outer mobile cowling 28. In fact, the turbine engine 1 also comprises a nacelle 30, a front part of which is formed by hollow cowls 32 which surround the fan casing 8 and the outer ferrule 14 of the intermediate casing. These cowls 32 are generally known as fan cowls. They are fitted articulated such as to allow the operators access in order to carry out maintenance operations. The cowls 32 are extended rearwards by the aforementioned outer mobile cowling 28, the latter being able in fact to be translated rearwards relative to the nacelle cowls 32, according to the longitudinal axis 6. In this respect, it should be noted that, throughout the description, the terms "front" and "rear" are considered relative to the direction of advance of the aircraft after the thrust of its turbine engines, this direction of advance being represented by the arrow 34 in FIG. 2.

Figure 2:
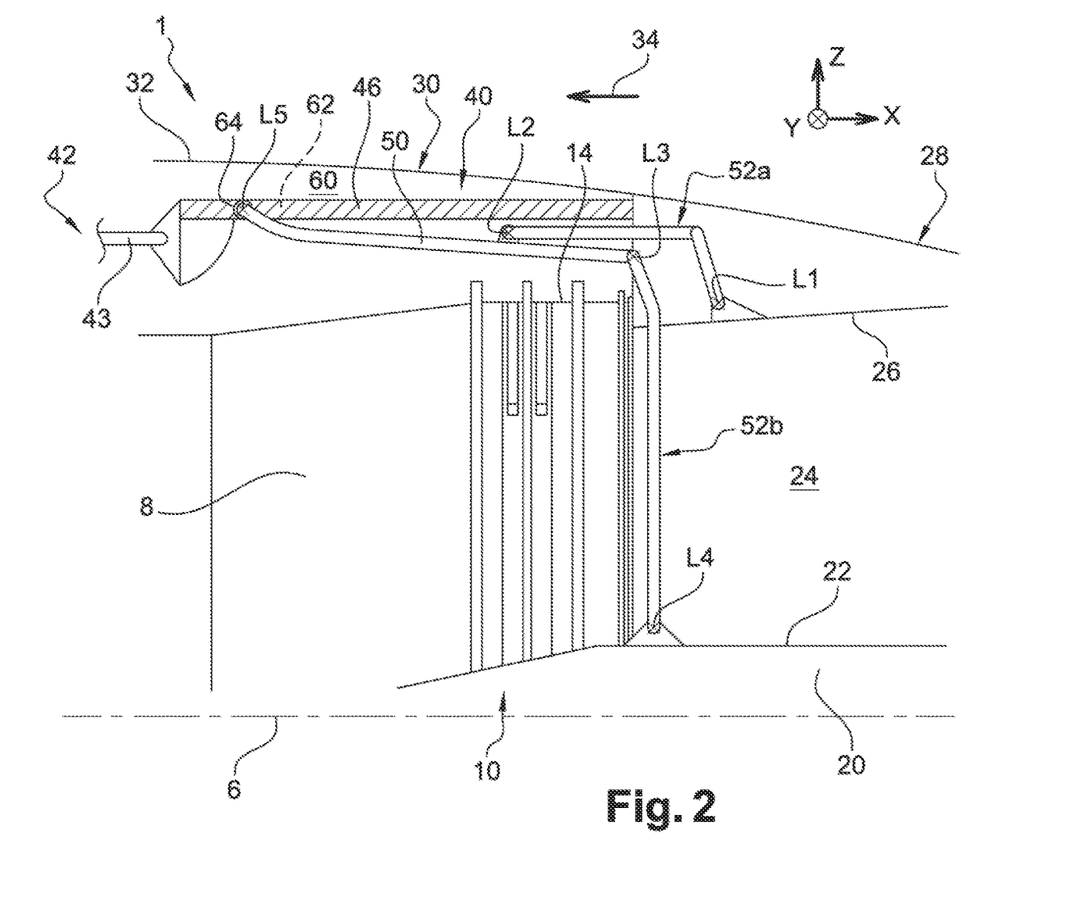
FIG. 2 represents a partial view in longitudinal cross section of the turbine engine shown in the preceding figure, with its thrust reverser system in the inactive configuration.
Figure 3:
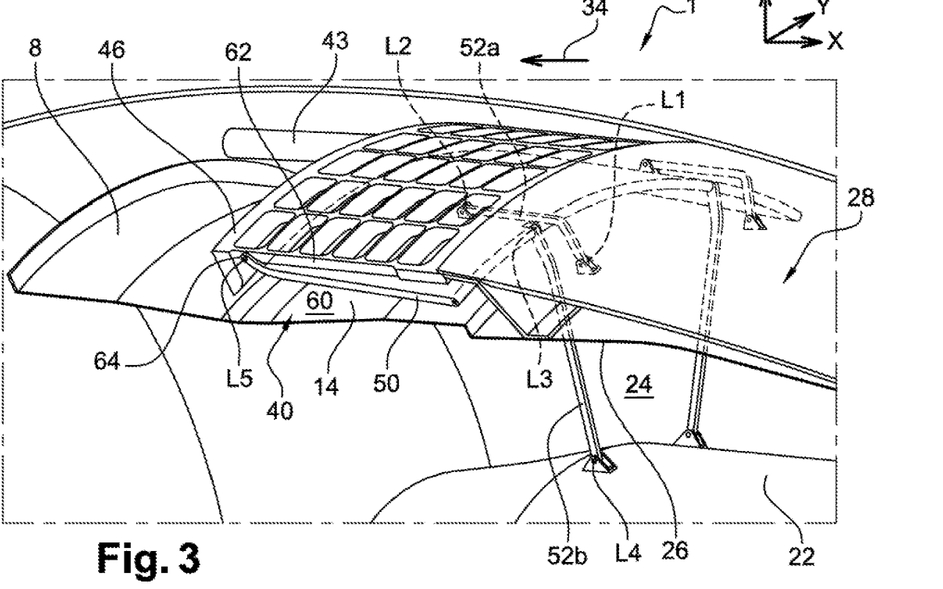
FIG. 3 represents a partial view in perspective of the turbine engine shown in the preceding figure.

In this environment, a thrust reverser system 40 specific to the present invention is integrated, an embodiment of which will now be described in its inactive configuration, as represented in FIGS. 2 to 4.

Firstly, it is noted that the reverser system 40 is formed from a plurality of modules which are repeated, and are arranged adjacent to one another in the tangential direction of the turbine engine, all around the axis 6. As will be described hereinafter, each module comprises a thrust reversal cascade 46 and a reverser door 50. At least some of these modules each comprise in the front part an actuator 42, the body of which is for example fitted fixed on the fan casing 8. The actuator 42 comprises an actuator rod 43 which is fitted articulated on a front end of the thrust reversal cascade 46.

In the inactive configuration, the cascade 46 is located radially towards the exterior, opposite the fan casing 8 and the outer ferrule 14 of the intermediate casing. The cascade 46 is situated at the front relative to the outer mobile cowling 28, and the rear end of this cascade 46 is integral with the front end of the cowling 28. Consequently, during the movements observed in the course of actuation of the thrust reverser system 40, the cascade 46 and the cowling 28 form a single, integral assembly, which is subjected to the same axial displacements.

In the inactive configuration, the cascade 46 and the actuator rod 43 are consequently located in an advanced position of the nacelle, at the fan cowls, which habitually have a larger diameter than that of the tapered rear part of the nacelle, thus making it possible to benefit from more space for their integration. This advantageously results in a nacelle 30 with a reduced outer diameter. In this respect, it should be noted that only the actuators 42 can put into motion all the parts of the module, such that no additional actuator is provided in the cowling 28. The latter can thus have reduced dimensions, having a positive impact on the dimensions of the remainder of the nacelle.

The reversal cascade 46 can have a conventional flat form, or it can be slightly rounded in the circumferential direction. In a conventional manner, it comprises orifices through which the air of the secondary flow duct 24 is designed to circulate, when the reverser system 40 is in the active configuration. It can reorient forwards a flow of air which passes through it, thanks to fins or similar elements provided between the orifices.

Below the cascade 46, the reverser system 40 comprises the reverser door 50, which is preferably substantially flat, and made in a single piece. In the inactive configuration, the door 50 is substantially parallel to the cascade 46, and this door is also situated at least partly radially opposite the fan casing 8.

The door 50 has a conventional design, which in the active configuration can close the secondary flow duct 24 at least partly, as will be described hereinafter.

In addition to the cascade 46 and the door 50, the reverser system 40 comprises two connection parts which make it possible to obtain the kinematics and synchronization required for the door and the cascade.

Firstly, there is a first connection part 52a in the global form of an "L", a first end of which is connected to the interior of the cowling 28 by a first articulated connection L1. In fact, the cowling 28 has a hollow body which opens at the front, and is partly defined by the inner wall 26 of the secondary flow duct 24. It is on this wall 26, inside the hollow which it defines, that the first end of the first connection part 52a is fitted articulated. Its second end, opposite the first, is connected to a central portion of the reverser door 50 by a second articulated connection L2. These two connections L1 and L2, as is the case for all of the other connections which will be described hereinafter, define axes of pivoting which are all substantially parallel to one another within a single reverser module. These axes of pivoting are preferably orthogonal to the longitudinal axis 6, and are oriented tangentially.

There is then a second connection part 52b, a first end of which is connected to a rear end of the reverser door 50, by means of a third articulated connection L3. Its second end, opposite the first, is connected to the inner wall 22 of the secondary flow duct 24 by a fourth articulated connection L4, close to the outer ferrule 14 of the intermediate casing. The second connection part 52b has a generally straight form, like a connecting rod, the first end of which can optionally be slightly inclined relative to the remainder of the connecting rod. In the inactive configuration, this makes it possible to bring it towards the rear end of the door 50 on which it is articulated.

In the inactive configuration of the reverser system 40, the first connection part 52a, the cascade 46 and the door 50 are thus arranged entirely in a housing 60, defined by the nacelle outside the secondary flow duct 24, in the thickness of the nacelle. The secondary flow duct 24 is thus not perturbed by the presence of these elements, and the outer wall 26 which delimits the secondary flow duct 24 can therefore be continuous, for example be being formed in a single piece. This makes it possible to improve substantially the overall aerodynamic performance of the turbine engine.

The housing 60 is partly defined by the hollow of the fan cowls 32, as well as by the hollow of the outer mobile cowling 28 situated in the rear axial continuity of the hollow of the fan cowls 32. In the inactive configuration, this space 60 also accommodates the actuator 42, as well as the first end of the second connection part 52b. The other part of the second connection part 52b is in turn arranged substantially radially in the secondary flow duct 24, and substantially close to a rear plane of the intermediate casing 10. Each connection part 52b is shielded from the secondary flow of air which passes through the flow duct 24 by a structural aerodynamic arm 16 of this casing 10, which is contained radially on the same plane, as shown in FIG. 4. Consequently, because of its particular position in the continuity of one of these arms 16, the second connection part 52b generates only very little perturbation of the secondary flow of air.

In addition, the reverser door 50 is fitted at its front end on the cascade 46 by a fifth connection L5, the second connection L2 thus being arranged between the third connection L3 and this fifth connection L5. The latter comprises one or a plurality of guide rails 62 which are integral with the cascade, preferably taking the form of oblong grooves provided directly in this same cascade, along it, in its thickness, and on both sides of it. Each rail 62 extends axially parallel to the cascade 46, and cooperates with a roller 64 which is fitted on the front end of the reverser door 50.

Thanks to this fifth connection L5, the front end of the door 50 can simultaneously slide along the cascade 46, and pivot relative to it.

In this respect, it is specified that the modules of the reverser system can be connected to one another at the cascades by the rollers 64. In fact, each of these rollers can form part of mechanical connection means provided between the cascades 46 which are directly consecutive in the tangential direction. There is also a sufficient number of these cascades provided for them to form an assembly extending over an angular sector of 300 to 360° around the longitudinal axis 6 of the turbine engine. By way of indicative example, there can for example be a number of cascades of between 4 and 12. The same applies to the reverser doors, which are designed to obstruct the same angular sector of the secondary flow duct 24 in the active configuration of the reverser system.

In this case, since the cascades 46 are secured to one another, it is not necessary to provide an actuator 42 for each module, such that the number of these actuators 42 can be smaller than the number of cascades. For example, one actuator 42 is provided every two cascades 46 in the tangential direction. In the mode represented in FIG. 4, nine cascades 46 are provided, and only three actuators 42.

One of the specific features of the invention consists in the fact that the actuation of the actuators 42 gives rise to the putting into motion of all of the parts of the thrust reverser system, without needing to provide additional actuation means. This particular so-called "in-line" arrangement makes it possible to benefit from simplicity of design, which also limits the overall mass of the thrust reverser system, and therefore increases the overall performance of the turbine engine.

Figure 5:
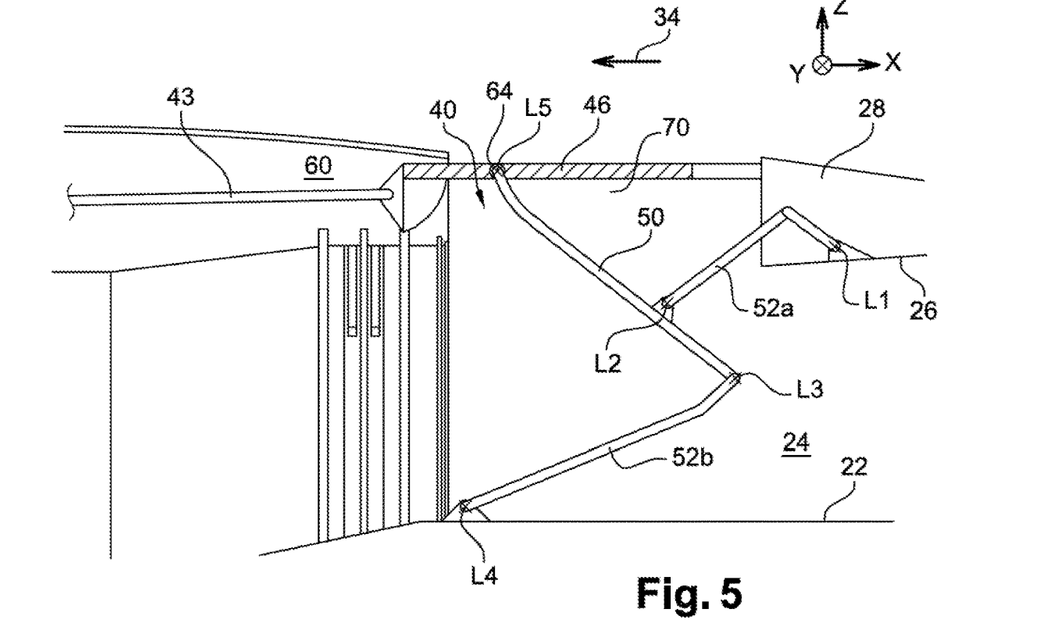
FIG. 5 represents a view similar to that in FIG. 2, during transition from an inactive configuration to an active configuration of the thrust reverser system.

In operation, when each actuator 42 is actuated such as to go from the inactive configuration to the active configuration, the actuator rod 43 is extracted rearwards, as represented in FIG. 5, showing an intermediate configuration between the inactive configuration and the active configuration.

Figure 6:
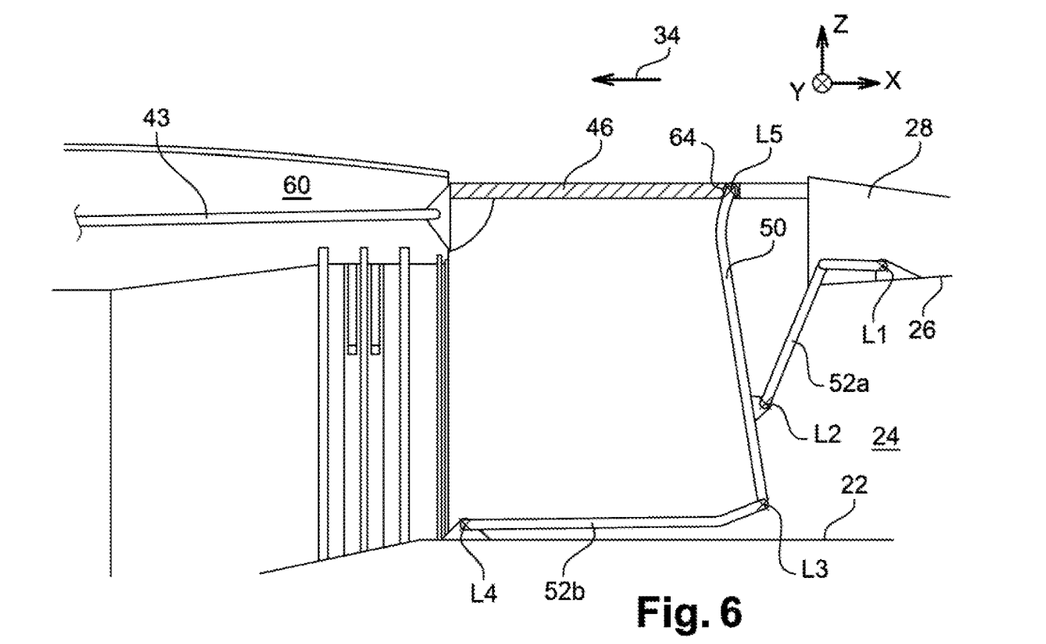
FIGS. 6 to 8 represent views similar to those of FIGS. 2 to 4, with the thrust reverser system in the active configuration.
Figure 7:
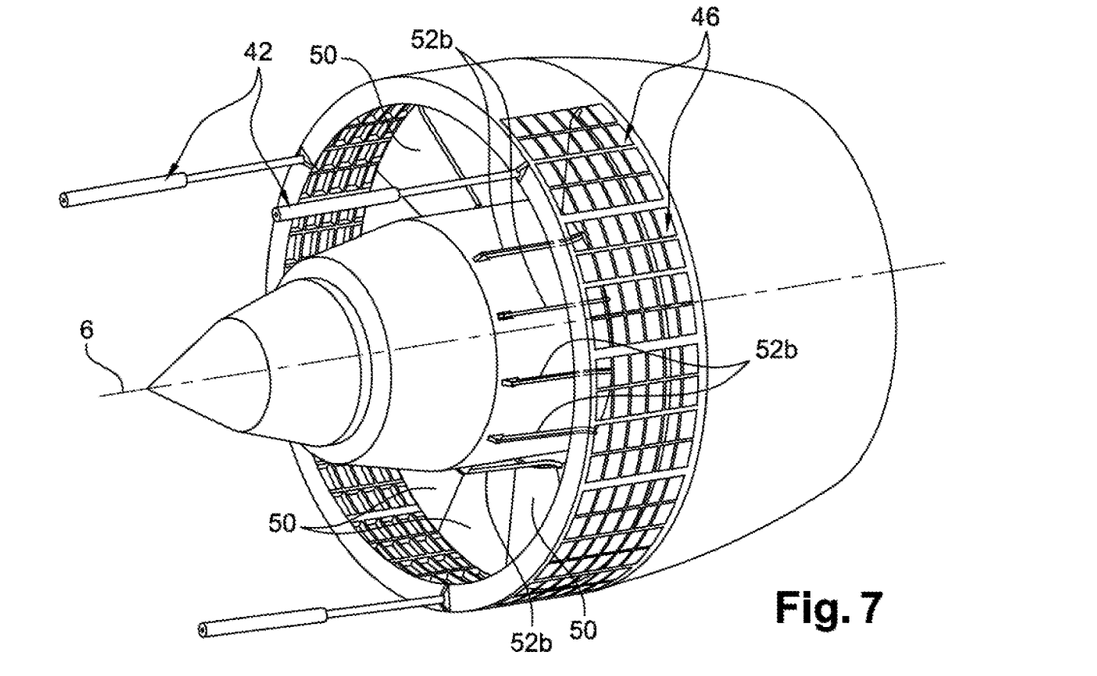
Figure 8:
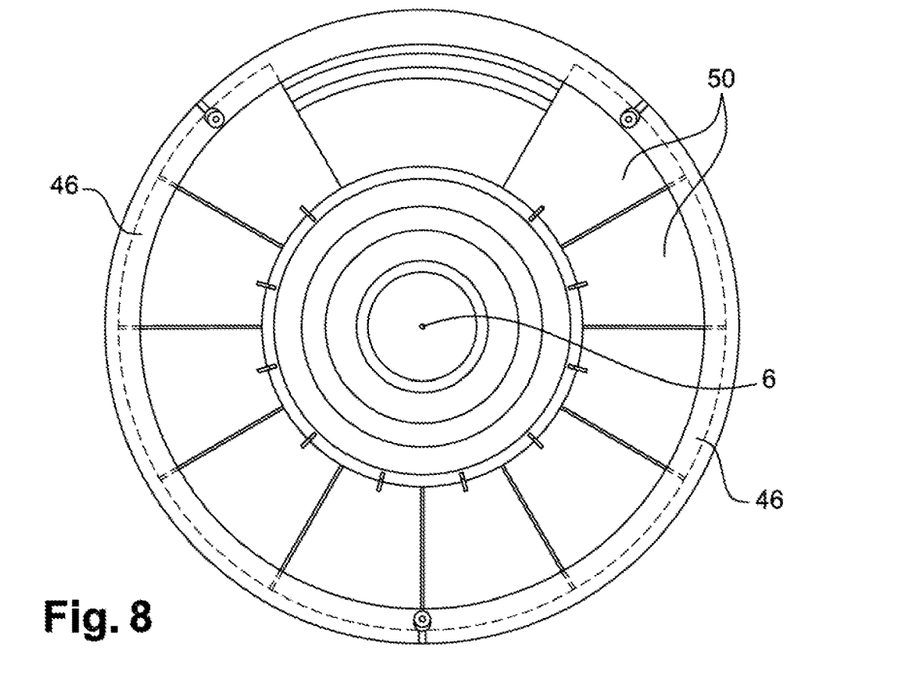

The extraction of the actuator rod 43, combined with the actions of tilting and entrainment caused by the connection parts 52a, 52b, give rise to different movements which will now be described with reference to FIG. 5, showing an intermediate configuration, and to FIGS. 6 to 8, showing the active configuration.

In fact, displacement rearwards of the cascade 46 is observed, directly because of the action of the actuator rod 43. This displacement is a translation in the direction X, which causes the cascade 46 to penetrate into a nacelle opening 70 which is progressively cleared by the outer mobile cowling 28. The latter is subjected to the same movement as the cascade 46.

Simultaneously, the reverser door 50 is subjected to a combined movement relative to the cascade 46, which is still in motion. This combined movement, which is dictated in particular by the connection parts 52a, 52b, leads to the displacement of the front end of the door 50 rearwards along the cascade 46. It also leads to the pivoting of this door 50 according to the fifth connection L5, around the axis of the rollers 64. This pivoting gives rise to plunging of the rear end of the door 50 into the secondary flow duct 24.

The discerningly positioned elements of the system 40 thus permit perfect synchronization of the movements, such that the door 50 can exit from the space 60 in which it is arranged axially, whilst plunging progressively towards the inside of the secondary flow duct 24, until it reaches a substantially radial position as shown in FIGS. 6 to 8. In the active configuration represented in these figures, the cascade 46 and the door 50 are arranged substantially orthogonally relative to one another. In addition, the front end of the door 50 (corresponding to its radially outer end in the active configuration), is always connected to the cascade 46 by the fifth connection L5 at a rear end of this cascade, until this connection L5 has been displaced. The door 50 thus remains entirely below the cascade 46, with the latter filling the opening 70 without plunging into the flow duct 24. This advantageously involves blocking of the flow of air in the flow duct 24, and forces its passage via the cascade 46.

During these displacements, the two connection parts 52a, 52b fulfil their function of tilting and entrainment of the door 50. The second connection part 52b thus pivots according to the fourth articulated connection L4, until it reaches a position in which it is locally substantially parallel and placed against the inner wall 22 of the secondary flow duct. The perturbations of the secondary flow caused by these connection parts 52b are minor. Also, the base of the "L" of the first connection part 52a is placed against the mobile outer wall 26, inside the cowling 28, whereas the branch of the "L" is extracted from the space 60, and projects slightly into the secondary flow duct 24 and to the rear of the door 50, which at least partially closes the aerodynamic duct 24.

It will be appreciated that various modifications can be made by persons skilled in the art to the invention which has just been described, purely by way of non-limiting examples.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A thrust reverser system for a turbine engine of a double-spool aircraft, the reverser system comprising:
    at least one thrust reversal cascade through which the air of a secondary flow duct of the turbine engine is configured to circulate in the active configuration of the reverser system;
    at least one reverser door configured to close the secondary flow duct at least partly when the reverser system is in the active configuration;
    at least one actuator,
    wherein, in an inactive configuration of the reverser system, the at least one reverser door is accommodated in a housing situated outside the secondary flow duct, and in which housing there is also located the at least one thrust reverser cascade entrained by the at least one actuator, and a rear end of which cascade is integral with a nacelle outer mobile cowling, the reverser system also comprising:
    a first connection part, a first end of which is connected inside the nacelle outer mobile cowling by a first articulated connection, and a second end of which is connected to the at least one reverser door by a second articulated connection;
    a second connection part, a first end of which is connected to a rear end of the at least one reverser door by a third articulated connection, and a second end of which is connected to an inner wall of the secondary flow duct by a fourth articulated connection;
    and wherein the at least one reverser door is fitted at a front end thereof on the cascade by a fifth connection which allows the front end to slide along the at least one thrust reverser cascade and to pivot relative to the at least one thrust reverser, the second articulated connection being arranged between the third articulated connection and the fifth connection, such that, during transition from the inactive configuration to the active configuration, the presence of the first and second connection parts combined with the action of the at least one actuator gives rise simultaneously to:
    displacement rearwards of the at least one thrust reverser cascade in the direction of a nacelle opening, cleared by the nacelle outer mobile cowling entrained rearwards together with the cascade; and
    a combined movement of the at least one reverser door relative to the at least one thrust reverser cascade, leading firstly to displacement of a front end of the at least one reverser door rearwards along the at least one thrust reverser cascade, and secondly to pivoting of the at least one reverser door according to the fifth connection, such as to cause plunging of the rear end into the secondary flow duct.

2. The reverser system according to claim 1, wherein, in the inactive configuration, the first connection part is accommodated in the housing, and the second connection part is accommodated partly in the housing.

3. The reverser system according to claim 1, wherein, in the inactive configuration, part of the second connection part is arranged substantially radially in the secondary flow duct, and is configured to be shielded from a secondary flow of air by an arm of an intermediate casing of the turbine engine, and in the active configuration, the second connection part is arranged locally substantially parallel to the inner wall of the secondary flow duct.

4. The reverser system according to claim 1, wherein the first connection part adopts a form globally of an "L".

5. The reverser system according to claim 1, wherein the at least one actuator comprises an actuator rod articulated on a front end of the at least one thrust reverser cascade.

6. The reverser system according to claim 1, wherein the fifth connection comprises:
- at least one door guide rail integral with the at least one thrust reverser cascade, and extending along the at least one thrust reverser; and
- a roller which cooperates with the at least one guide rail, and is fitted on the front end of the at least one reverser door.

7. The reverser system according to claim 1, wherein the housing is an inner space of the nacelle.

8. The reverser system according to claim 1, wherein, in the inactive configuration, the at least one thrust cascade and the at least one reverser door are substantially parallel, and are each situated at least partly radially opposite a fan casing of the turbine engine.

9. The reverser system according to claim 1, the at least one thrust reverser cascade comprises a plurality of thrust reverser cascades adjacent in the tangential direction of the turbine engine, such as to form an assembly of cascades extending over an angular sector of 300 to 360° around a longitudinal axis of the turbine engine, and wherein each cascade is associated with a reverser door.

10. The reverser system according to claim 9, wherein the cascades are connected to one another mechanically, such that the number of actuators is smaller than the number of cascades.

11. A double-spool aircraft turbine engine comprising a thrust reverser system according to claim 1.

12. An aircraft comprising at least one turbine engine according to claim 11.

* * * * *